United States Patent
Sun et al.

(10) Patent No.: US 11,023,158 B2
(45) Date of Patent: Jun. 1, 2021

(54) CONSTRAINING PLACEMENT OF REPLICA SEGMENT PAIRS AMONG DEVICE PAIRS BASED ON CODING SEGMENT COUNT

(71) Applicant: EMC IP Holding Company LLC, Hopkinton, MA (US)

(72) Inventors: Ao Sun, Shanghai (CN); Gary Jialei Wu, Shanghai (CN); Lu Lei, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/456,891

(22) Filed: Jun. 28, 2019

(65) Prior Publication Data
US 2020/0241760 A1    Jul. 30, 2020

(30) Foreign Application Priority Data
Jan. 28, 2019    (CN) .......................... 201910081914.8

(51) Int. Cl.
*G06F 3/06*    (2006.01)

(52) U.S. Cl.
CPC ............ *G06F 3/065* (2013.01); *G06F 3/0608* (2013.01); *G06F 3/0644* (2013.01); *G06F 3/0689* (2013.01)

(58) Field of Classification Search
CPC ...... G06F 3/0689; G06F 3/065; G06F 3/0631; G06F 3/0605; G06F 11/2094; H04L 67/125; H04L 67/1097; H04L 67/1095
See application file for complete search history.

(56) References Cited

U.S. PATENT DOCUMENTS

| | | | | |
|---|---|---|---|---|
| 9,826,030 | B1* | 11/2017 | Dhoolam | ............ H04L 67/1097 |
| 9,826,041 | B1* | 11/2017 | Dhoolam | .............. G06F 3/0689 |
| 10,198,205 | B1* | 2/2019 | Freilich | .................. G06F 3/061 |
| 2008/0222480 | A1* | 9/2008 | Huang | .............. H03M 13/1191 |
| | | | | 714/752 |

(Continued)

OTHER PUBLICATIONS

Honicky, R. J., and Ethan L. Miller. "Replication under scalable hashing: A family of algorithms for scalable decentralized data distribution." 18th International Parallel and Distributed Processing Symposium, 2004. Proceedings.. IEEE, 2004. (Year: 2004).*

*Primary Examiner* — Charles Rones
*Assistant Examiner* — Hewy H Li
(74) *Attorney, Agent, or Firm* — Amin, Turocy & Watson, LLP (57) ABSTRACT

Embodiments of the present disclosure provide a method, apparatus, and computer program product for storing data. A method for storing data comprises: dividing data to be stored into a first number of data segments; generating a second number of coding segments based on the first number of data segments, such that at least a part of data segments from the first number of data segments can be derived from the second number of coding segments and remaining data segments in the first number of data segments; generating, for each of the first number of data segments, a replication data segment identical to the data segment; and storing the first number of data segments, the first number of replication data segments and the second number of coding segments into a plurality of storage devices. Embodiments of the present disclosure can reduce extra overhead for protecting data while ensuring high data availability.

20 Claims, 9 Drawing Sheets

(56) References Cited

U.S. PATENT DOCUMENTS

2014/0122441 A1\* 5/2014 Vervaet ............... G06F 11/1076
707/687
2020/0045111 A1\* 2/2020 Kannan .................. G06F 3/067

\* cited by examiner

CONSTRAINING PLACEMENT OF REPLICA SEGMENT PAIRS AMONG DEVICE PAIRS BASED ON CODING SEGMENT COUNT

RELATED APPLICATION

The present application claims the benefit of priority to Chinese Patent Application No. 201910081914.8, filed on Jan. 28, 2019, which application is hereby incorporated into the present application by reference herein in its entirety.

FIELD

Embodiments of the present disclosure generally relate to the field of data storage, and more specifically, to a method, apparatus and computer program product for storing data.

BACKGROUND

In a modern storage system, data is typically stored across a plurality of storage devices. In such case, in order to avoid data loss, two types of storage solutions are typically employed. One type is to store a plurality of copies of data into different storage devices. As such, when a certain storage device fails, data copies stored on other storage devices are still available. The type of solution has a disadvantage of high storage overhead. The other type is to generate extra erasure codes for data, and store the data and the generated erasure codes together into a plurality of storage devices. When a certain storage device fails, data in the storage device can be recovered through data and/or erasure codes stored in other storage devices. The disadvantage of the solution lies in that the data recovery process may spend a long time, and thus not all of the lost data can be recovered immediately. In some cases, the solution may cause long-term and large-scale data unavailability issues.

SUMMARY

Embodiments of the present disclosure provide a method, apparatus and computer program product for storing data.

In a first aspect of the present disclosure, there is provided a method for storing data. The method comprises: dividing data to be stored into a first number of data segments; generating a second number of coding segments based on the first number of data segments, such that at least a part of data segments from the first number of data segments can be derived from the second number of coding segments and remaining data segments in the first number of data segments; generating, for each of the first number of data segments, a replication data segment identical to the data segment; and storing the first number of data segments, the first number of replication data segments and the second number of coding segments into a plurality of storage devices.

In a second aspect of the present disclosure, there is provided an apparatus for storing data. The apparatus comprises at least one processing unit and at least one memory. The at least one memory is coupled to the at least one processing unit and stores instructions for execution by the at least one processing unit. The instructions, when executed by the at least one processing unit, cause the apparatus to perform acts comprising: dividing data to be stored into a first number of data segments; generating a second number of coding segments based on the first number of data segments, such that at least a part of data segments from the first number of data segments can be derived from the second number of coding segments and remaining data segments in the first number of data segments; generating, for each of the first number of data segments, a replication data segment identical to the data segment; and storing the first number of data segments, the first number of replication data segments and the second number of coding segments into a plurality of storage devices.

In a third aspect of the present disclosure, there is provided a computer program product. The computer program product is stored tangibly in a non-transient computer storage medium and comprises machine-executable instructions. The machine executable instructions, when executed by a device, cause the device to execute any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent, through the following detailed description of the example embodiments of the present disclosure with reference to the accompanying drawings, in which the same reference symbols generally refer to the same elements.

Throughout the drawings, the same or similar reference symbols refer to the same or similar elements.

DETAILED DESCRIPTION OF EMBODIMENTS

Preferred embodiments of the present disclosure will now be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

As described above, in the modern storage system, data is typically stored across a plurality of storage devices. In the case, in order to avoid data loss, two types of storage solutions are typically employed.

Figure 1:
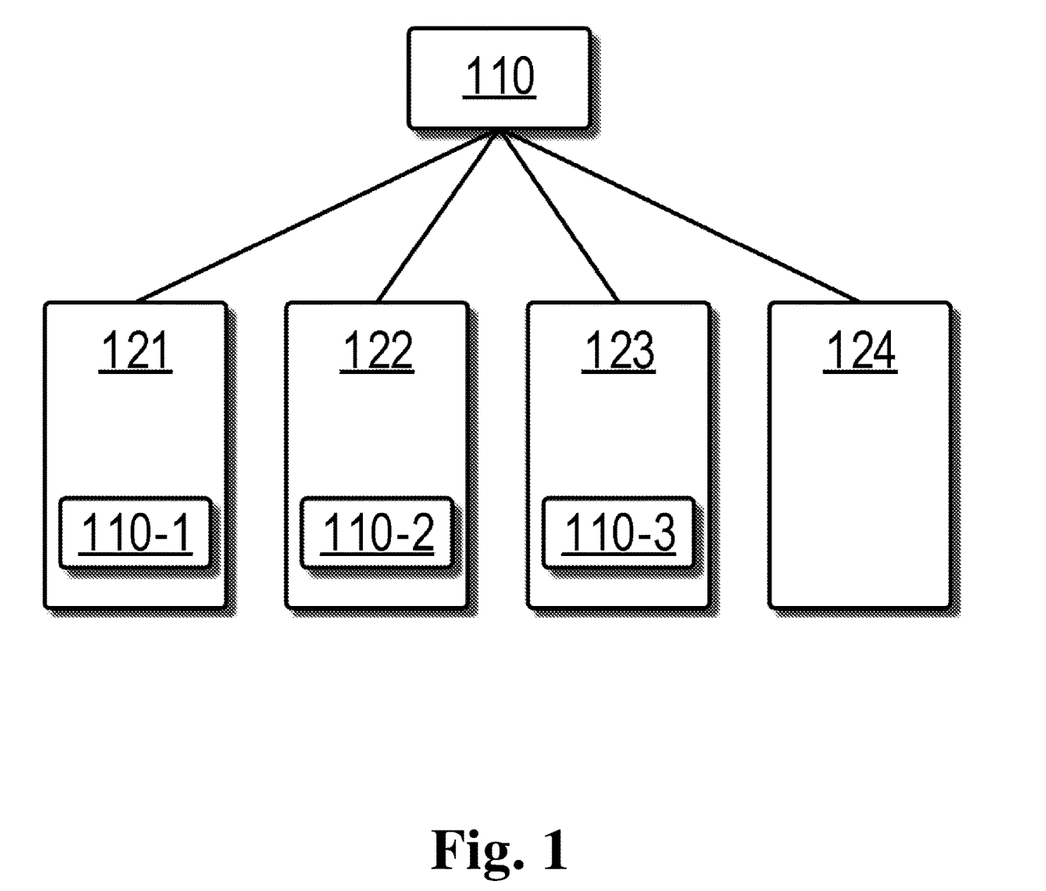
FIG. 1 illustrates a schematic diagram of a legacy solution for storing data.

One solution is to store a plurality of copies of data into different storage devices. For example, FIG. 1 illustrates a schematic diagram of such legacy solution. As shown in FIG. 1, three identical copies of 110-1, 110-2 and 110-3 of data 110 are respectively stored in three different storage devices 121, 122 and 123. When any one of the three storage devices 121, 122 and 123 (for example, the storage device 121) fails, data copies 110-2 and 110-3 on the storage devices 122 and 123 are still available. When any two of the three storage devices 121, 122 and 123 (for example, the storage devices 121 and 122), the data copy 110-3 on the storage device 123 is still available.

It can be seen that the storage solution as shown in FIG. 1 can tolerate failure of at most two storage devices. However, the solution has the disadvantage of requiring high storage overhead. For example, when the data amount to be stored is 128 MB, the storage space to be actually occupied can be up to 384 MB.

Figure 2:
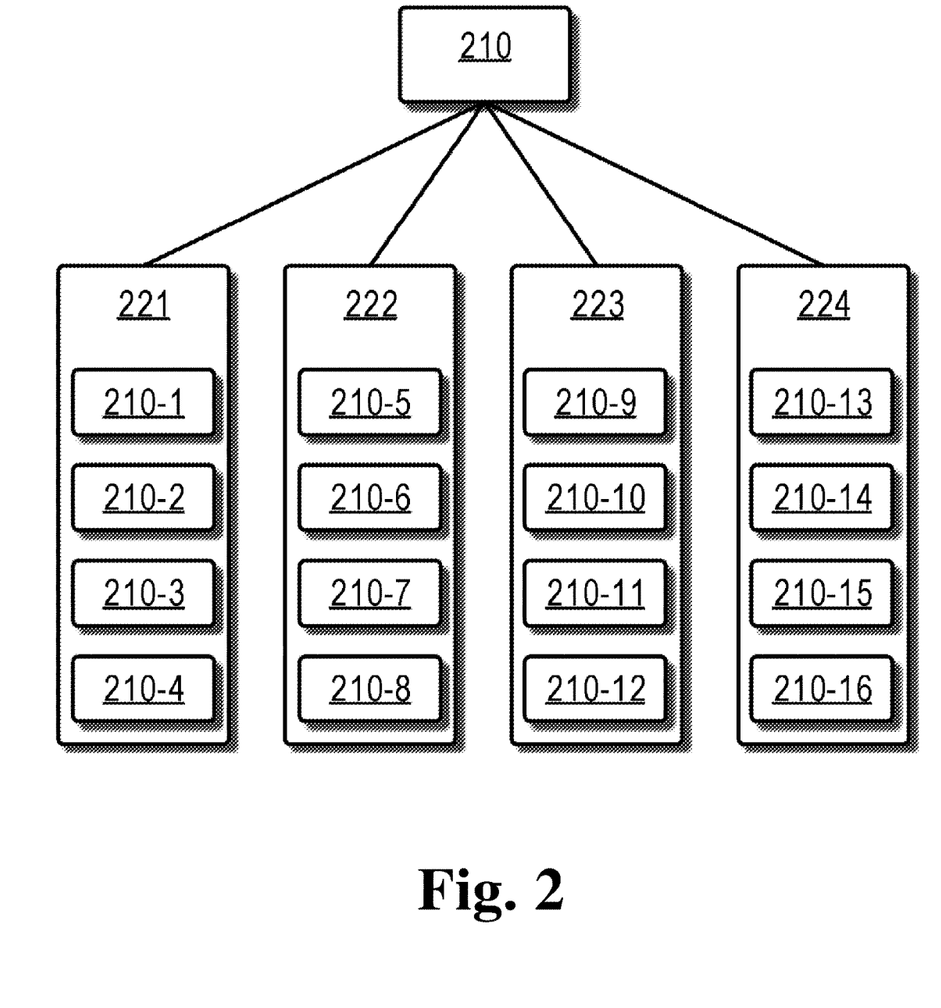
FIG. 2 illustrates a schematic diagram of a further legacy solution for storing data.

The other solution is to generate additional erasure code for data, and store the data and the erasure code together into a plurality of storage devices. For example, FIG. 2 illustrates a schematic diagram of such legacy solution. As shown in FIG. 2, the data 210 is, for example, divided into data segments 210-1, 210-2 . . . 210-12. Moreover, 4 additional coding segments 210-13, 210-14 . . . 210-16 are further created for the data 210, to ensure that when at most 4 segments from the segments 210-1, 210-2 . . . 210-16 are lost (for example, due to failure of storage devices), the lost data can be recovered from the remaining segments. That is, so long as there are 12 available segments in segments 210-1, 210-2 . . . 210-16, the lost segments can be recovered based on the remaining available segments.

In view of the above, the storage solution as shown in FIG. 2 can tolerate failure of a storage device or four segments. When the data amount to be stored is 128 MB, the storage space to be actually occupied is 128×4/3 MB which is much less than that in the storage solution as shown in FIG. 1. However, the disadvantage of the solution lies in that the data recovery may spend a long time, and thus not all of the lost data can be recovered immediately. In some cases, the solution may cause long-term and large-scale data unavailability issues.

Embodiments of the present disclosure provide a solution for storing data, so as to solve the above problems and one or more of other potential problems. In the solution, a copy of data is stored additionally on the basis of the solution as shown in FIG. 2, so as to reduce the extra overhead for data protection while ensuring high data availability.

Figure 3:
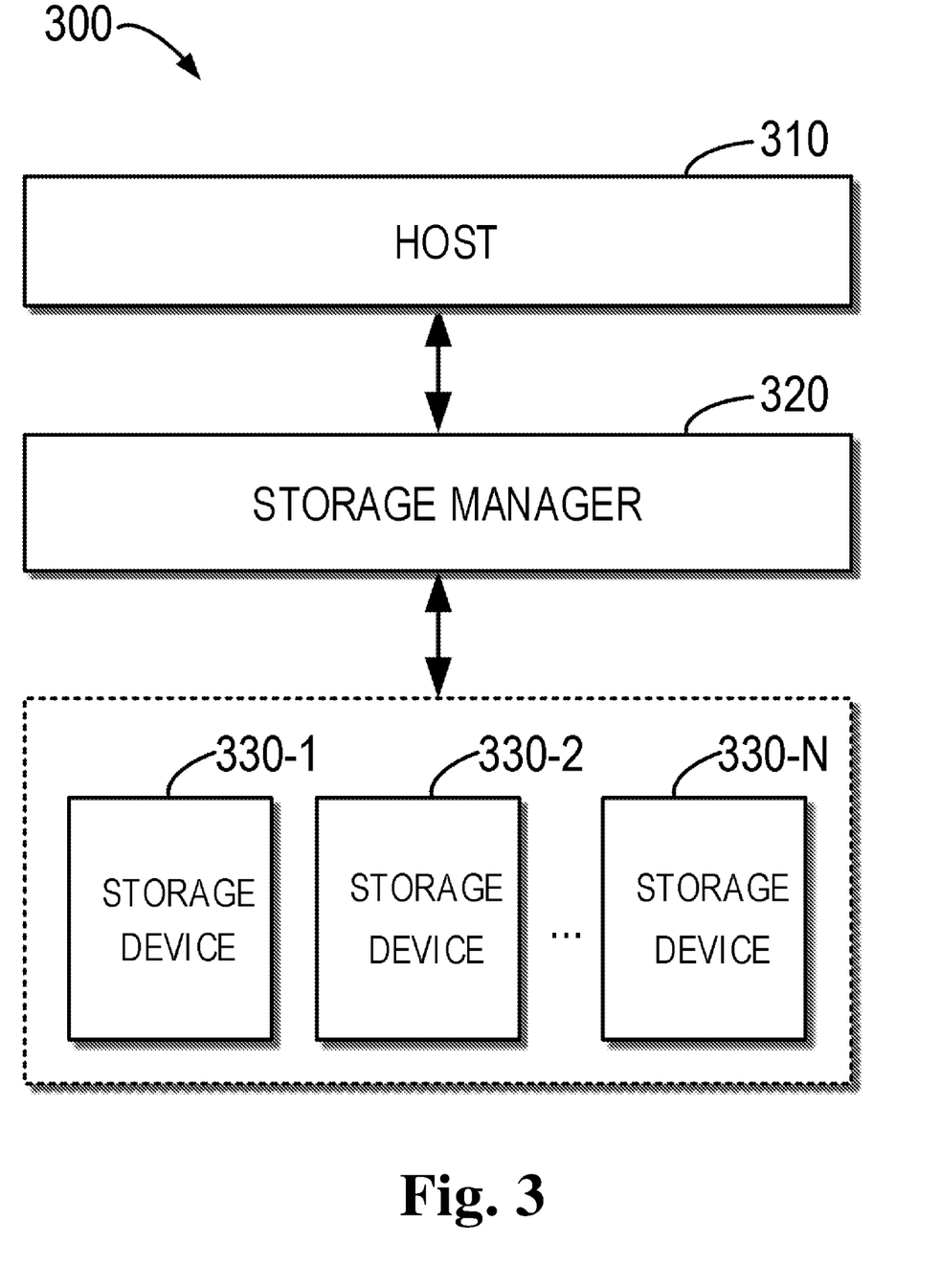
FIG. 3 illustrates a schematic diagram of an example environment in which embodiments of present disclosure can be implemented.

FIG. 3 illustrates a block diagram of an example environment 100 in which embodiments of the present disclosure can be implemented. As shown in FIG. 3, the environment 300 includes a host 310, a storage manager 320 and a plurality of storage devices 330-1, 330-2 . . . 330-N (which are collectively or individually referred to as "storage device", where N>1). It would be appreciated that the structure of the environment 300 is described merely for the purpose of illustration, without suggesting any limitation to the scope of the present disclosure. For example, the embodiments of the present disclosure are also applicable to an environment different than the environment 300.

The host 310 can be, for example, any physical computer, virtual machine, server or the like, which runs user applications. The host 310 can send to a storage manager 320 an input/output (I/O) request, for example, for reading the stored data from the storage device 330 and/or writing into the storage device 330 data to be stored. In response to receiving a read request from the host 310, the storage manager 320 may read data from the storage device 330, and return the read data to the host 310. In response to receiving a write request from the host 310, the storage manager 320 can write to the storage device 330 data to be stored. The storage device 330 can be any non-volatile storage medium currently known or to be developed in the future, such as a disk, Solid-State Drive (SSD), disk array or the like.

Figure 4:
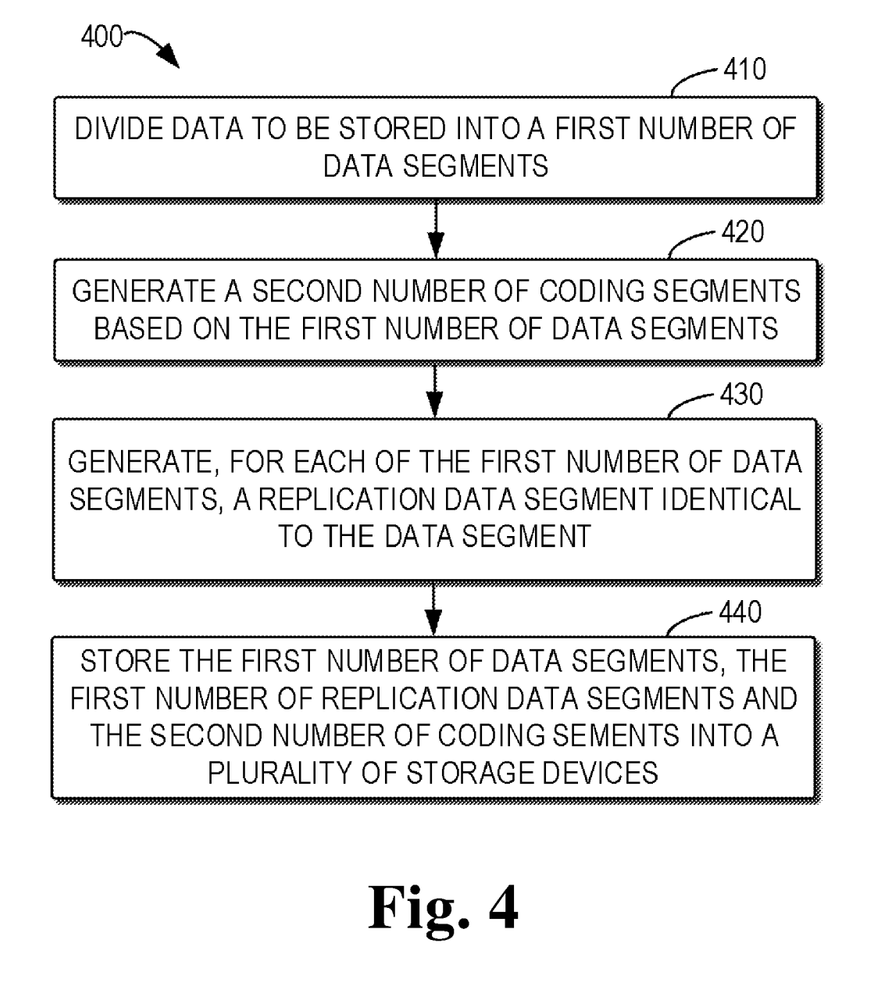
FIG. 4 illustrates a flowchart of an example method for storing data according to embodiments of the present disclosure.

FIG. 4 illustrates a flowchart of an example method 400 for storing data according to the embodiments of the present disclosure. For example, the method 400 can be executed by the storage manager 320 as shown in FIG. 3. It would be appreciated that the method 400 may further include additional acts not shown and/or may omit some acts as shown, and the scope of the present disclosure is not limited in the aspect.

At block 410, the storage manager 320 divides data to be stored into a first number of data segments. In some embodiments, the storage manager 320 may divide the data to be stored into a plurality of data segments of the same size. Alternatively, in some other embodiments, the storage manager 320 can also divide the data to be stored into a plurality of data segments of different sizes.

Figure 5:
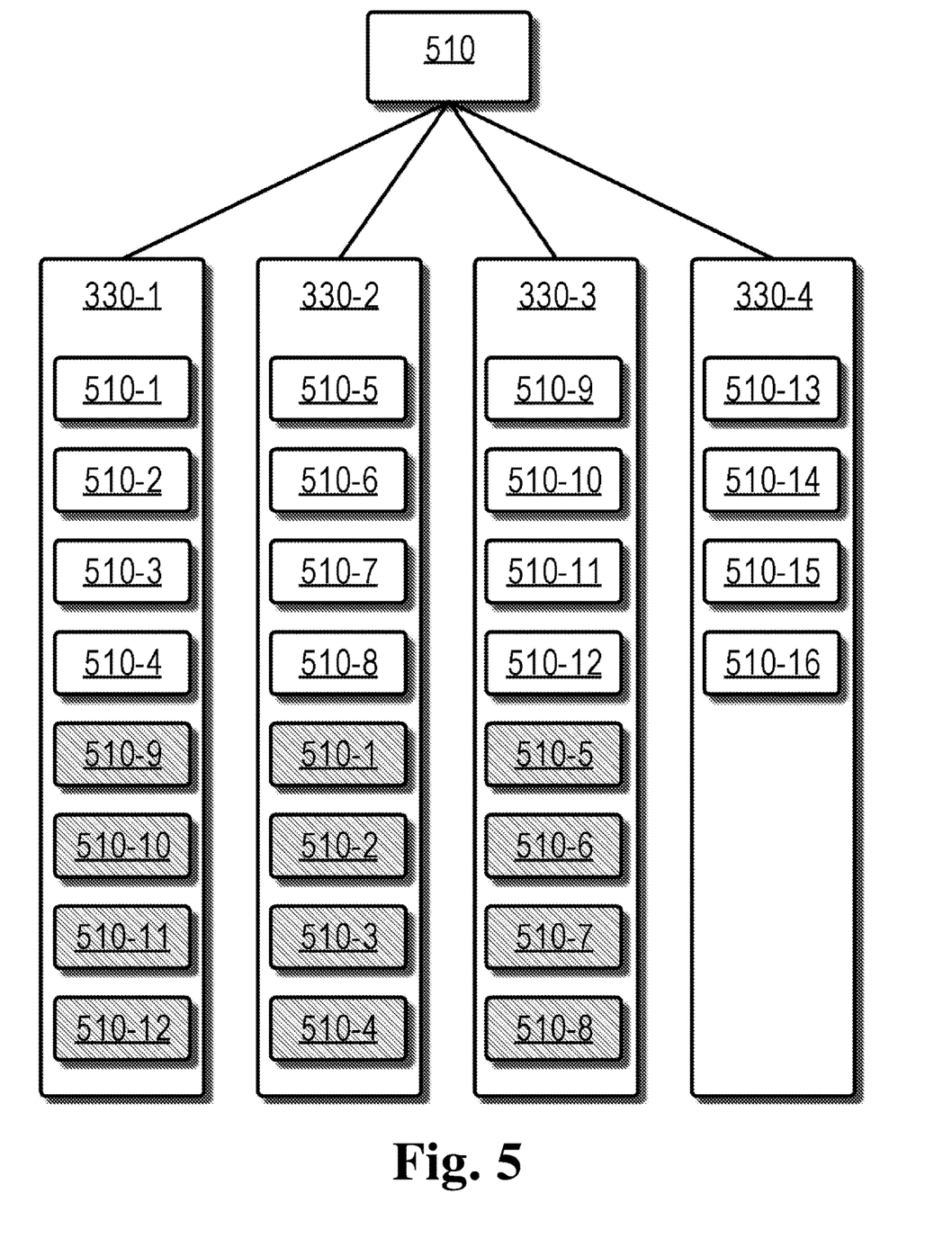
FIG. 5 illustrates a schematic diagram of a data storage solution according to embodiments of the present disclosure.

FIG. 5 illustrates a schematic diagram of a data storage solution according to embodiments of the present disclosure. For example, as shown in FIG. 5, the storage manager 320 divides data 510 into 12 data segments 510-1, 510-2 . . . 510-12 (which are shown with un-filled blocks). It would be appreciated that 12 data segments as shown herein are provided only as an example of "a first number" mentioned above, without suggesting any limitation to the scope of the present disclosure. In practice, the divided number of data segments can be a different value from 12 (for example, 16, 20 or the like).

At block 420, the storage manager 320 generates a second number of coding segments based on the first number of data segments, such that at least a part of data segments from the first number of data segments can be derived from the second number of coding segments and remaining data segments from the first number of data segments. In some embodiments, the number of the at least a part of data segments is not greater than the second number.

The storage manager 320 can use any method or technology currently known or to be developed in the future to generate the second number of coding segments. In addition, when at least a part of data segments from the first number of data segments are not available due to a failure of storage devices, the storage manager 320 can derive unavailable segments from the remaining available segments (including data segments and coding segments) using the similar method or technology.

As shown in FIG. 5, the storage manager 320 generates, based on the 12 data segments 510-1, 510-2 . . . 510-12 (which are shown with un-filled blocks), four coding segments 510-13, 510-14 . . . 510-16, such that when at most 4 segments from the segments 510-1, 510-2 . . . 510-16 (which are shown with un-filled blocks) are lost, the lost data can be received from the remaining segments. That is, so long as there are 12 available segments from the segments 510-1, 510-2 . . . 510-16 (which are shown with un-filled blocks), the lost data can be recovered. It would be appreciated that the 4 coding segments as shown herein are provided only as an example of "a second number" mentioned above, without suggesting any limitation to the scope of the present disclosure. In practice, the number of the generated coding segments may also be a different value from 4.

At block 430, the storage manager 320 generates, for each of the first number of data segments, a replication data segment identical to the data segment.

As shown in FIG. 5, the storage manager 320 generates, for each of the 12 data segments 510-1, 510-2 . . . 510-12, a corresponding replication data segment. For illustration, in FIG. 5, the reference symbol of a replication data segment is identical to that of a corresponding original data segment, and the original data segment is shown with an un-filled block, while the replication data segment is represented by a filled block. That is, the storage manager 320 can generate, for the 12 data segments, 12 replication data segments respectively.

At block 440, the storage manager 320 stores the first number of data segments, the first number of replication data segments and the second number of data segments into a plurality of storage devices 330.

In some embodiments, the first number of data segments may include a first data segment, and the first number of replication data segments may include a corresponding first replication data segment. The storage manager 320 may store the first data segment and the first replication data segment into different storage devices, respectively.

As shown in FIG. 5, the data segment 510-1 (which is shown with an un-filled block) is stored in the storage device 330-1, while the corresponding replication data segment 510-1 (which is shown with a filled block) is stored in the storage device 330-2. As another example, the data segment 510-5 (which is shown with an un-filled block) is stored in the storage device 330-2, while the corresponding replication data segment 510-5 (which is shown with a filled block) into the storage device 330-3.

In this way, the embodiments of the present disclosure can ensure that, when any one of the storage devices fails, data can be supplied to the host 310 without requiring any data recovery operation, since other storage devices have copies of the data in the failed storage device.

Alternatively, or in addition, in some embodiments, the storage manager 320 may store at least a part of the first number of data segments, the first number of replication data segments and the second number of coding segments into a predetermined number of storage devices from a plurality of storage devices, such that a number of pairs of data segments and replication data segments stored in the predetermined number of storage devices is not greater than the second number. In some embodiments, the above predetermined number is two. Alternatively, or in addition, in other embodiments, the predetermined number may be a different value from 2 (for example, greater than 2).

As shown in FIG. 5, the number of pairs of data segments and replication data segments stored in the storage devices 330-1 and 330-2 is 4 (i.e., the pair of the data segment 510-1 and the replication data segment 510-1, the pair of the data segment 510-2 and the replication data segment 510-2, the pair of the data segment 510-3 and the replication data segment 510-3, and the pair of the data segment 510-4 and the replication data segment 510-4), which is not greater than the number of coding segments (i.e., the second number). As another example, the number of pairs of data segments and replication data segments stored in the storage devices 330-2 and 330-3 is 4 (i.e., the pair of the data segment 510-5 and the replication data segment 510-5, the pair of the data segment 510-6 and the replication data segment 510-6, the pair of the data segment 510-7 and the replication data segment 510-7, and the pair of the data segment 510-8 and the replication data segment 510-8), which is not greater than the number of coding segments (i.e., the second number).

In this way, embodiments of the present disclosure can ensure that, when a predetermined number of storage devices from a plurality of storage devices fail, at most the second number of segments are lost and the lost data can be recovered from the remaining available segments.

Various failure scenarios of the data storage solution as shown in FIG. 5 will be further discussed in detail with reference to FIGS. 6A to 6C.

Figure 6A:
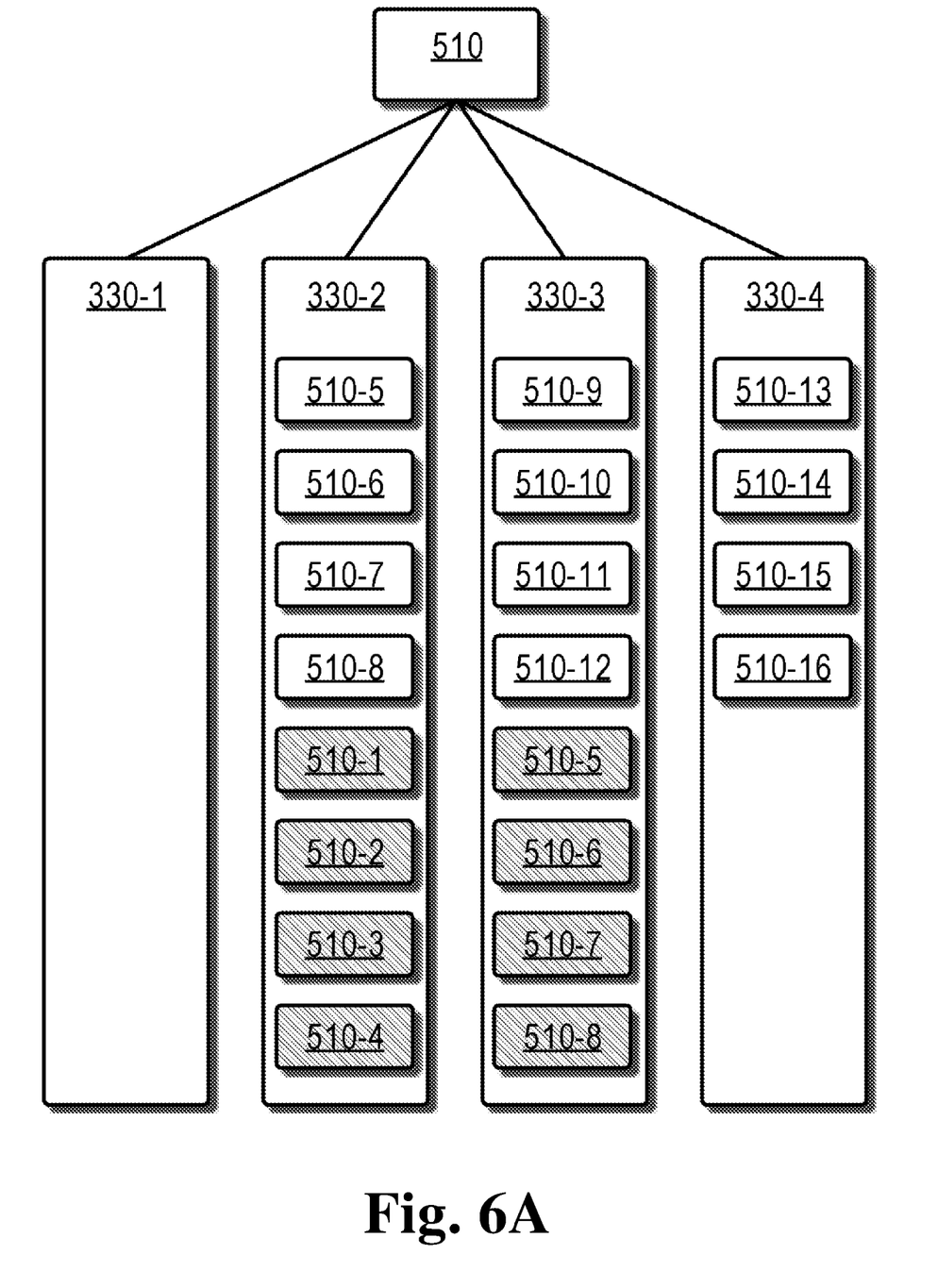
FIGS. 6A-6C illustrate various failure scenarios of the data storage solution according to embodiments of the present disclosure.

FIG. 6A illustrates a scenario in which only one storage device fails. For example, it is assumed that the storage device 330-1 fails. As shown in FIG. 6A, since the segments 510-5 through 510-6 on the storage devices 330-2 through 330-4 are still available and the storage device 330-2 stores thereon the replication data segments 510-1 through 510-4, no data segment is lost. That is, data can be supplied to the host 310 without requiring any data recovery operation. If the storage device 330-2 or 330-2 fails, the situation is similar. If the storage device 330-4 fails, since the data segments 510-1 through 510-12 on the storage devices 330-1 through 330-3 are still available, it is not required to execute any data recovery operation before data are supplied to the host 310.

Figure 6B:
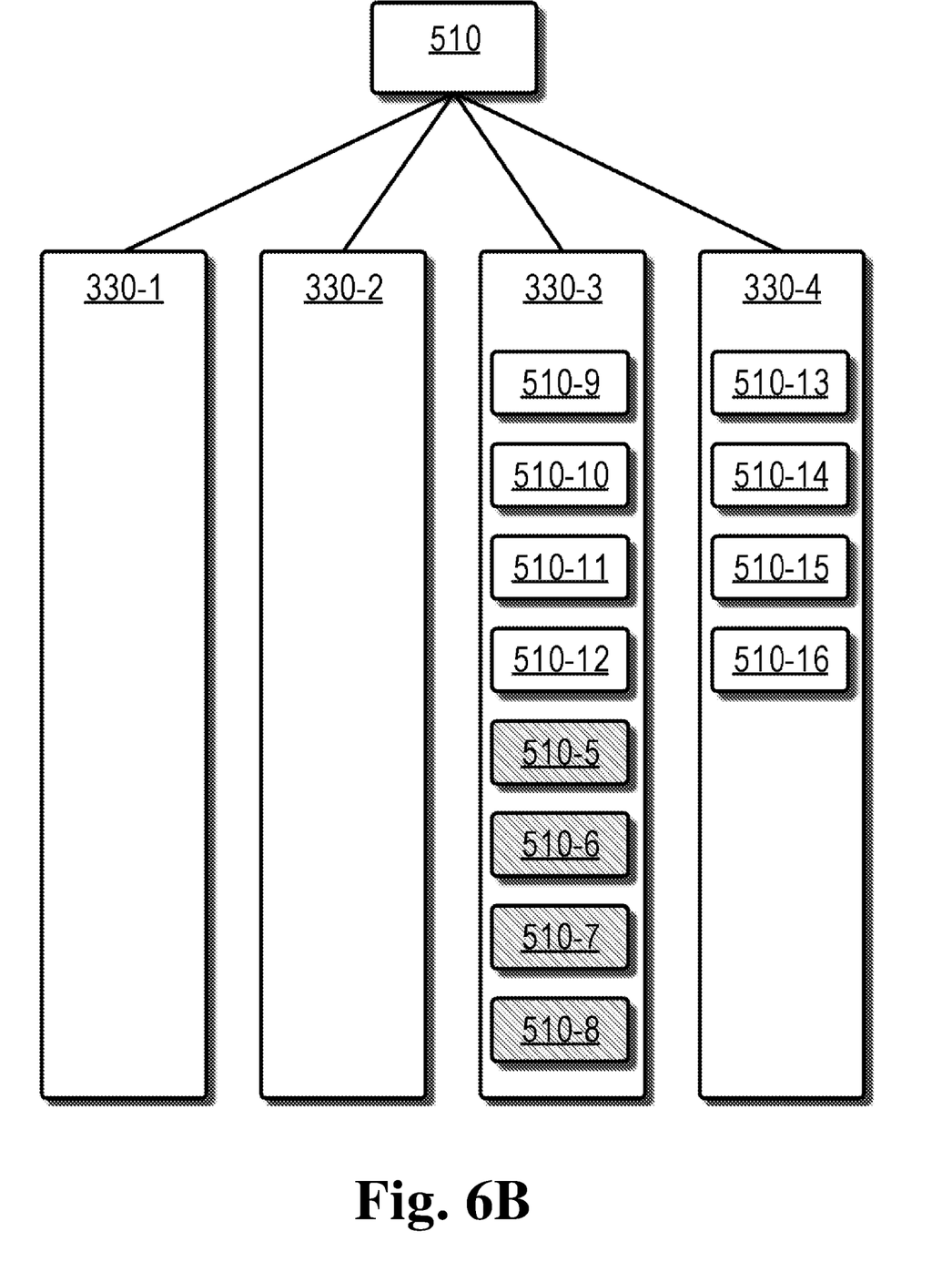

FIG. 6B illustrates a scenario in which two storage devices fail. For examples, the storage devices 330-1 and 330-2 fail. As shown in FIG. 6B, the segments 510-5 through 510-16 on the storage devices 330-3 through 330-4 are still available, i.e., the lost segments are 510-1 through 510-4. However, since there are still 12 available segments, the lost data segments 510-1 through 510-4 can be derived, via a data recovery operation, from the remaining twelve available segments (i.e., 510-5 through 510-16). Therefore, in the case, complete loss of data will not incur. In addition, due to a small number of lost data segments, the data recovery operation can be completed in a short time, without causing a long-term data unavailability issue. If the storage devices 330-2 and 330-3 fail, or if the storage devices 330-3 and 330-1 fail, the situation is similar.

Figure 6C:
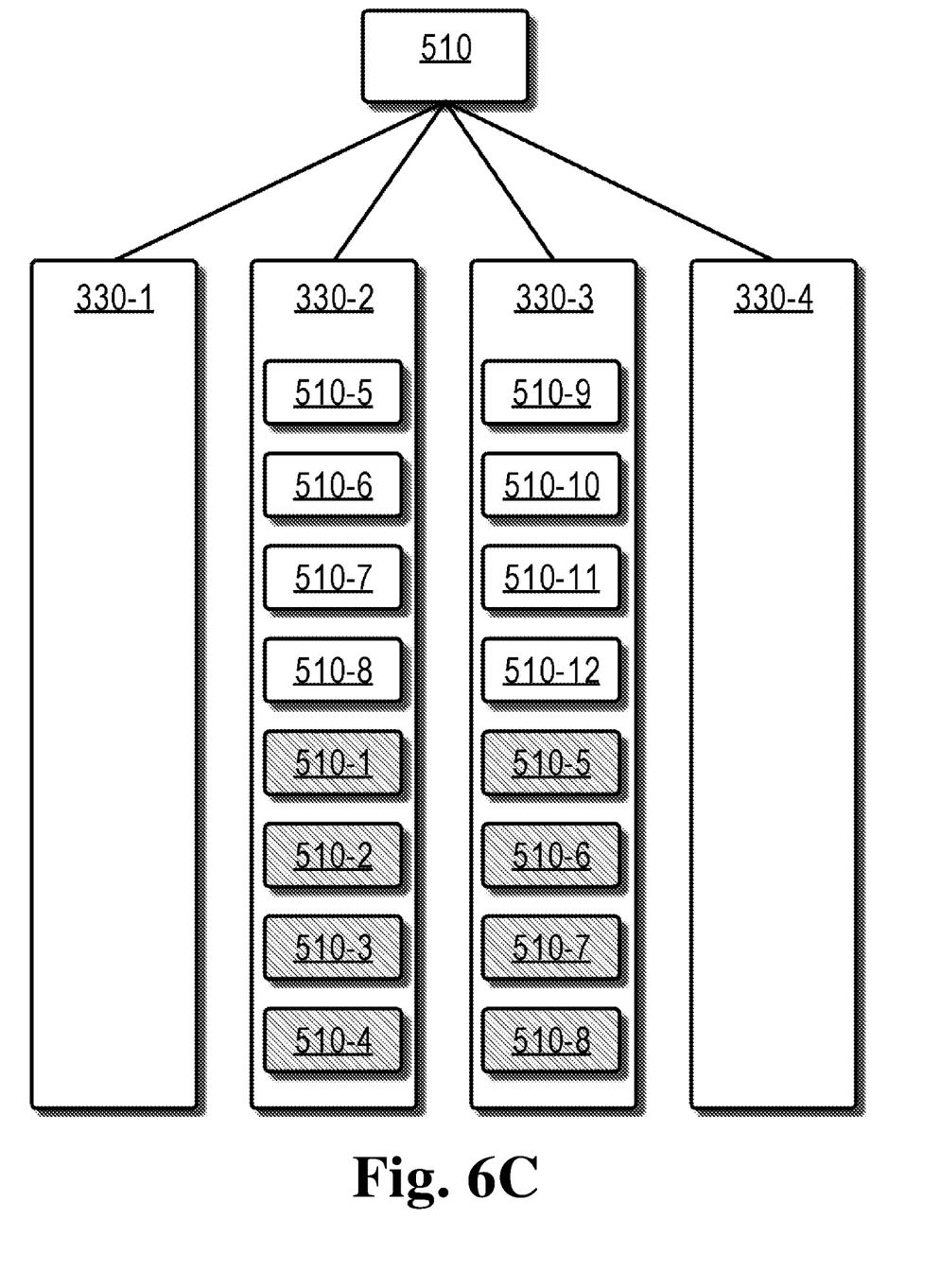

FIG. 6C illustrates the scenario in which two storage devices fail, where the failed storage devices at least include the storage device 330-4 for storing coding segments. For example, in the example as shown in FIG. 6C, the storage devices 330-1 and 330-4 fail. As shown in FIG. 6C, the data segments 510-1 through 510-12 on the storage devices 330-2 through 330-3 are still available, and only the coding segments 510-13 through 510-16 are lost. That is, in the case, no data segment is lost, and data can be supplied to the host 310 without executing any data recovery operation. If the storage devices 330-2 and 330-4 fail, or if the storage devices 330-3 and 330-4 fail, the situation is similar.

It can be seen that, in the examples as shown in FIGS. 5 to 6C, if two storage devices fail, complete data loss will not occur, and the performance is similar to that of the legacy solution as shown in FIG. 1. However, in the examples as shown in FIGS. 5 to 6C, if the data to be stored is 128 MB, the storage space to be actually occupied is 128×7/4 MB which is far less than that in the storage solution as shown in FIG. 1. On the other hand, in the example as shown in FIGS. 5 to 6C, when a failure occurs, there is a probability of 50% that no data recovery operation is required. That is, compared with the storage solution as shown in FIG. 2, embodiments of the present disclosure can provide higher data availability. Hence, compared with the legacy solutions as shown in FIGS. 1 and 2, embodiments of the present disclosure can reduce extra overhead for data protection while ensuring high data availability.

In the example as shown in FIGS. 5 to 6C, although the number (i.e., the second number) of data segments is shown as 4, it would be appreciated that this is provided only for the purpose of illustration, without suggesting any limitation to the scope of the present disclosure. The embodiments of the present disclosure can be easily extended to a storage scheme different from the examples shown in FIGS. 5 to 6C.

Example implementations of the method of the present disclosure have been described above in detail with reference to FIGS. 3 to 6C, implementations of a corresponding apparatus will be described as below.

In some embodiments, there is provided an apparatus for storing data. The apparatus comprises a dividing module configured to divide data to be stored into a first number of data segments; a generating module configured to generate a second number of coding segments based on the first number of data segments, such that at least a part of data segments from the first number of data segments can be derived from the second number of coding segments and remaining data segments in the first number of data segments; a replicating module configured to generate, for each of the first number of data segments, a replication data segment identical to the data segment; and a storage module configured to store the first number of data segments, the first number of replication data segments and the second number of coding segments into a plurality of storage devices.

In some embodiments, the number of the at least a part of data segments is not greater than the second number.

In some embodiments, the first number of data segments may include a first data segment, and the first number of replication data segments may include a first replication data segment corresponding to the first data segment. The storage module is further configured to store the first data segment into a first storage device from the plurality of storage devices; and store the first replication data segment into a second storage device from the plurality of storage devices, the second storage device being different than the first storage device.

In some embodiments, the storage module is further configured to store at least a part of the first number of storage segments, the first number of replication data segments and the second number of coding segments into a predetermined number of storage devices from the plurality of storage devices, such that the number of pairs of data segments and replication data segments stored in the predetermined number of storage devices is not greater than the second number.

In some embodiments, the predetermined number is two.

Figure 7:
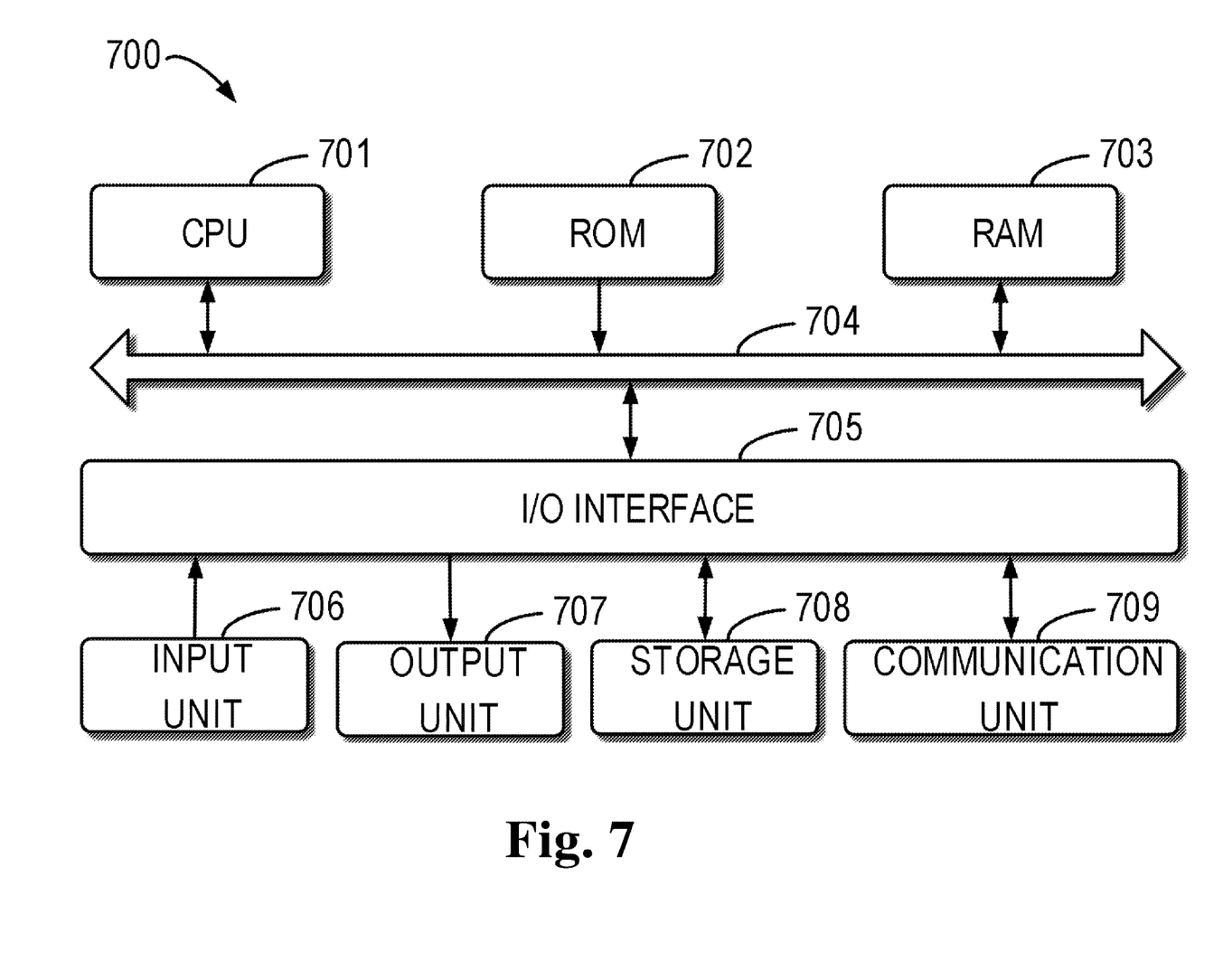
FIG. 7 illustrates a schematic block diagram of an example device that can be used to implement embodiments of the present disclosure.

FIG. 7 illustrates a block diagram of an example device 700 that can be used to implement the embodiments of the present disclosure. For example, the storage manger 320 as shown in FIG. 3 can be implemented by the device 700. As shown in FIG. 7, the device 700 includes a central processing unit (CPU) 701 which performs various appropriate actions and processing, based on computer program instructions stored in a read-only memory (ROM) 702 or computer program instructions loaded from a storage unit 708 to a random access memory (RAM) 703. The RAM 703 stores therein various programs and data required for operations of the device 700. The CPU 701, the ROM 702 and the RAM 703 are connected via a bus 704 with one another. An input/output (I/O) interface 705 is also connected to the bus 704.

The following components in the device 700 are connected to the I/O interface 705: an input unit 706 such as a keyboard, a mouse and the like; an output unit 707 including various kinds of displays and a loudspeaker, etc.; a storage unit 708 including a magnetic disk, an optical disk, and etc.; a communication unit 709 including a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the method 400, may be executed by the processing unit 701. For example, in some embodiments, the method 400 may be implemented as a computer software program that is tangibly included in a machine readable medium, e.g., the storage unit 708. In some embodiments, part or all of the computer programs may be loaded and/or mounted onto the device 700 via ROM 702 and/or communication unit 709. When the computer program is loaded to the RAM 703 and executed by the CPU 701, one or more steps of the method 400 as described above may be executed.

The present disclosure may be a method, an apparatus, a system, and/or a computer program product. The computer program product may include a computer readable storage medium having computer readable program instructions thereon for causing a processor to carry out aspects of the present disclosure.

The computer readable storage medium can be a tangible apparatus that can retain and store instructions for use by an instruction execution apparatus. The computer readable storage medium may be, for example, but is not limited to, an electronic storage apparatus, a magnetic storage apparatus, an optical storage apparatus, an electromagnetic storage apparatus, a semiconductor storage apparatus, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable devices or other apparatus to produce a computer implemented process, such that the instructions which are executed on the computer, other programmable apparatus, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method, comprising:
dividing data to be stored into a first number of data segments;
generating a second number of coding segments based on the first number of data segments, such that at least a part of data segments from the first number of data segments is able to be derived from the second number of coding segments and remaining data segments in the first number of data segments;
generating, for each of the first number of data segments, a replication data segment identical to the data segment; and
storing the first number of data segments, the first number of replication data segments, and the second number of coding segments into a plurality of storage devices, the storing comprising:
each data segment of the data segments being stored on a different storage device of the plurality of storage devices than each corresponding replication data segment of the replication data segments,
setting a limit on a quantity of pairs stored in any two storage devices of the plurality of storage devices, wherein the limit is set equal to the second number of coding segments,
each pair of the pairs comprising a data segment of the data segments and a corresponding replication data segment of the replication data segments, and
enforcing that the quantity of pairs stored in any two storage devices of the plurality of storage devices does not exceed the limit.

2. The method of claim 1, wherein a third number of at least the part of data segments is not greater than the second number.

3. The method of claim 1, wherein the first number of data segments include a first data segment, the first number of replication data segments include a first replication data segment corresponding to the first data segment, and wherein the storing of the first number of data segments, the first number of replication data segments and the second number of coding segments into the plurality of storage devices further comprises:
- storing the first data segment into a first storage device from the plurality of storage devices; and
- storing the first replication data segment into a second storage device from the plurality of storage devices, the second storage device being different than the first storage device.

4. The method of claim 1, further comprising, in response to failure of a storage device of the plurality of storage devices, supplying requested data of the data to a requesting host device from at least one other non-failed storage device of the plurality of storage devices that have copies of the requested data.

5. The method of claim 4, wherein the requested data is supplied to the requesting host device from the at least one other non-failed storage device without requiring any data recovery operation, since other storage devices have copies of the data in the failed storage device.

6. The method of claim 1, further comprising, in response to failure of two storage devices of the plurality of storage devices, recovering a pair stored on the two storage devices from at least two other non-failed storage device of the plurality of storage devices.

7. An apparatus, comprising:
- at least one processing unit;
- at least one memory coupled to the at least one processing unit and storing instructions for execution by the at least one processing unit, the instructions, when executed by the at least one processing unit, causing the apparatus to perform operations comprising:
- dividing data to be stored into a first number of data segments;
- generating a second number of coding segments based on the first number of data segments, such that at least a part of data segments from the first number of data segments can be derived from the second number of coding segments and remaining data segments in the first number of data segments;
- generating, for each of the first number of data segments, a replication data segment identical to the data segment; and
- storing the first number of data segments, the first number of replication data segments, and the second number of coding segments into a plurality of storage devices, wherein the storing comprises:
  - each data segment of the data segments is stored on a different storage device of the plurality of storage devices than each corresponding replication data segment of the replication data segments,
  - establishing a limit on a quantity of pairs stored in any two storage devices of the plurality of storage devices, wherein the limit is equal to the second number of coding segments,
  - each pair of the pairs comprises a data segment of the data segments and a corresponding replication data segment of the replication data segments, and
  - restricting the quantity of pairs, stored in any two storage devices of the plurality of storage devices, so as not to exceed the limit.

8. The apparatus of claim 7, wherein a third number of at least the part of data segments is not greater than the second number.

9. The apparatus of claim 7, wherein the first number of data segments include a first data segment, the first number of replication data segments include a first replication data segment corresponding to the first data segment, and wherein the storing of the first number of data segments, the first number of replication data segments and the second number of coding segments into the plurality of storage devices further comprises:
- storing the first data segment into a first storage device from the plurality of storage devices; and
- storing the first replication data segment into a second storage device from the plurality of storage devices, the second storage device being different than the first storage device.

10. The apparatus of claim 7, wherein the operations further comprise, in response to failure of a storage device of the plurality of storage devices, supplying requested data of the data to a requesting host device from at least one other non-failed storage device of the plurality of storage devices that have copies of the requested data.

11. The apparatus of claim 10, wherein the requested data is supplied to the requesting host device from the at least one other non-failed storage device without requiring any data recovery operation, since other storage devices have copies of the data in the failed storage device.

12. The apparatus of claim 7, wherein the operations further comprise, in response to failure of two storage devices of the plurality of storage devices, recovering a pair stored on the two storage devices from at least two other non-failed storage device of the plurality of storage devices.

13. A computer program product, which is tangibly stored on a non-transient computer storage medium and comprises machine-executable instructions, the machine-executable instructions, when executed by a device, causing the device to execute operations, comprising:
- dividing data to be stored into a first number of data segments;
- generating a second number of coding segments based on the first number of data segments, such that at least a part of data segments from the first number of data segments is derivable from the second number of coding segments and remaining data segments in the first number of data segments;
- generating, for each of the first number of data segments, a replication data segment identical to the data segment; and
- storing the first number of data segments, the first number of replication data segments, and the second number of coding segments into a plurality of storage devices, wherein the storing comprises:
  - each data segment of the data segments is stored on a different storage device of the plurality of storage devices than each corresponding replication data segment of the replication data segments, and
  - setting a limit on a quantity of pairs stored in any two storage devices of the plurality of storage devices, wherein the limit is set equal to the second number, wherein each pair of the pairs comprises a data segment of the data segments and a corresponding replication data segment of the replication data segments, and constraining the quantity of pairs stored in any two storage devices of the plurality of storage devices, the constraining resulting in the quantity of pairs not exceeding the limit.

14. The computer program product of claim 13, wherein a third number of at least the part of data segments is less than or equal to the second number.

15. The computer program product of claim 13, wherein the first number of data segments include a first data segment, the first number of replication data segments include a first replication data segment corresponding to the first data segment, and wherein the storing of the first number of data segments, the first number of replication data segments and the second number of coding segments into the plurality of storage devices comprises:

storing the first data segment into a first storage device from the plurality of storage devices.

16. The computer program product of claim 15, wherein the storing of the first number of data segments, the first number of replication data segments and the second number of coding segments into the plurality of storage devices further comprises:

storing the first replication data segment into a second storage device from the plurality of storage devices.

17. The computer program product of claim 16, wherein the second storage device is different than the first storage device.

18. The computer program product of claim 13, wherein the operations further comprise, in response to failure of a storage device of the plurality of storage devices, requested data of the data is supplied to a requesting host device from at least one other non-failed storage device of the plurality of storage devices that have copies of the requested data.

19. The computer program product of claim 18, wherein the requested data is supplied to the requesting host device from the at least one other non-failed storage device without requiring any data recovery operation, since other storage devices have copies of the data in the failed storage device.

20. The computer program product of claim 13, wherein the operations further comprise, in response to failure of two storage devices of the plurality of storage devices, recovering a pair stored on the two storage devices from at least two other non-failed storage device of the plurality of storage devices.

* * * * *